(12) United States Patent
Ronda et al.

(10) Patent No.: US 10,969,670 B2
(45) Date of Patent: Apr. 6, 2021

(54) LIGHTING DEVICE WITH CERAMIC GARNET

(71) Applicant: KONINKLIJKE PHILIPS N.V., Eindhoven (NL)

(72) Inventors: Cornelis Reinder Ronda, Aachen (DE); Jacobus Gerardus Boerekamp, Aachen (DE); Hendrik Johannes Boudewijn Jagt, Aachen (DE)

( * ) Notice: Subject to any disclaimer, the term of this patent is extended or adjusted under 35 U.S.C. 154(b) by 455 days.

(21) Appl. No.: 15/525,848

(22) PCT Filed: Nov. 4, 2015

(86) PCT No.: PCT/EP2015/075728
§ 371 (c)(1),
(2) Date: May 10, 2017

(87) PCT Pub. No.: WO2016/075014
PCT Pub. Date: May 19, 2016

(65) Prior Publication Data
US 2017/0315433 A1   Nov. 2, 2017

(30) Foreign Application Priority Data

Nov. 11, 2014   (EP) ..................................... 14192693

(51) Int. Cl.
*G03B 21/20*   (2006.01)
*C04B 35/44*   (2006.01)
(Continued)

(52) U.S. Cl.
CPC ............ *G03B 21/204* (2013.01); *C04B 35/44* (2013.01); *C04B 35/64* (2013.01);
(Continued)

(58) Field of Classification Search
CPC .............. G03B 21/204; G03B 21/2013; G03B 21/2066; G03B 21/16; C04B 35/44;
(Continued)

(56) References Cited

U.S. PATENT DOCUMENTS 7,316,497 B2   1/2008   Rutherford et al.
9,567,518 B2   2/2017   Miyagawa et al.
(Continued)

FOREIGN PATENT DOCUMENTS

EP   1815532 A1   8/2007
JP   2008536266 A   9/2008
(Continued)

OTHER PUBLICATIONS

Extended European Search Report dated May 22, 2015, European Application No. 14192693.1, 8 pages.
(Continued)

*Primary Examiner* — Andrew J Coughlin
*Assistant Examiner* — Jessica M Apenteng

(57) ABSTRACT

The invention provides a lighting device comprising a plurality of solid state light sources and an elongated ceramic body having a first face and a second face defining a length (L) of the elongated ceramic body, the elongated ceramic body comprising one or more radiation input faces and a radiation exit window, wherein the second face comprises the radiation exit window, wherein the plurality of solid state light sources are configured to provide blue light source light to the one or more radiation input faces and are configured to provide to at least one of the radiation input faces a photon flux of at least $1.0*10^{17}$ photons/(s·mm²), wherein the elongated ceramic body comprises a ceramic material configured to wavelength convert at least part of the blue light source light into at least converter light, wherein the ceramic material comprises an $A_3B_5O_{12}:Ce^{3+}$ ceramic (Continued)

material, wherein A comprises one or more of yttrium (Y), gadolinium (Gd) and lutetium (Lu), and wherein B comprises aluminum (Al).

11 Claims, 5 Drawing Sheets

(51) Int. Cl.
    *C09K 11/77* (2006.01)
    *C04B 35/645* (2006.01)
    *C04B 35/64* (2006.01)
    *F21V 9/08* (2018.01)
    *F21V 8/00* (2006.01)
    *G02B 27/30* (2006.01)
    *F21V 29/503* (2015.01)
    *F21V 29/70* (2015.01)
    *F21Y 115/30* (2016.01)
    *F21Y 115/10* (2016.01)
    *G03B 21/16* (2006.01)

(52) U.S. Cl.
    CPC ...... C04B 35/6455 (2013.01); C09K 11/7774 (2013.01); F21V 9/08 (2013.01); G02B 6/0006 (2013.01); G02B 6/0008 (2013.01); G02B 27/30 (2013.01); G03B 21/2013 (2013.01); G03B 21/2066 (2013.01); *C04B 2235/3222* (2013.01); *C04B 2235/3224* (2013.01); *C04B 2235/3225* (2013.01); *C04B 2235/3229* (2013.01); *C04B 2235/604* (2013.01); *C04B 2235/656* (2013.01); *C04B 2235/6581* (2013.01); *C04B 2235/6584* (2013.01); *C04B 2235/663* (2013.01); *C04B 2235/664* (2013.01); *C04B 2235/764* (2013.01); *C04B 2235/94* (2013.01); *C04B 2235/95* (2013.01); *F21V 29/503* (2015.01); *F21V 29/70* (2015.01); *F21Y 2115/10* (2016.08); *F21Y 2115/30* (2016.08); *G03B 21/16* (2013.01)

(58) Field of Classification Search
    CPC ................ C04B 35/64; C04B 35/6455; C04B 2235/3222; C04B 2235/3224; C04B 2235/3225; C04B 2235/3229; C09K 11/7774; F21V 9/08; F21V 29/503; F21V 29/70; G02B 6/0006; G02B 6/0008; G02B 27/30; F21Y 2115/30; F21Y 2115/10
    USPC ........................................................ 362/583
    See application file for complete search history.

(56) References Cited

U.S. PATENT DOCUMENTS

| | | |
|---|---|---|
| 9,695,360 B2 | 7/2017 | Li et al. |
| 2007/0279914 A1* | 12/2007 | Rutherford .......... G02B 6/0068 362/341 |
| 2011/0210658 A1* | 9/2011 | Pan ........................ B32B 18/00 313/112 |
| 2013/0194777 A1 | 8/2013 | Berben et al. |

FOREIGN PATENT DOCUMENTS

| | | |
|---|---|---|
| JP | 2010235388 A | 10/2010 |
| JP | 2012083695 A | 4/2012 |
| JP | 2013505303 A | 2/2013 |
| JP | 2014143344 A | 8/2014 |
| JP | 2014525480 A | 9/2014 |
| JP | 2014192127 A | 10/2014 |
| WO | 2006035353 A2 | 4/2006 |
| WO | 2006/106883 A1 | 10/2006 |
| WO | 2008/012712 A1 | 1/2008 |
| WO | 2013/025713 A1 | 2/2013 |
| WO | 2013088309 A1 | 6/2013 |
| WO | 2014/156550 A1 | 10/2014 |

OTHER PUBLICATIONS

EPO as ISA, "International Search Report and Written Opinion" dated Feb. 8, 2016 from International Application No. PCT/EP2015/075728, filed Nov. 4, 2015, 14 pages.

* cited by examiner

LIGHTING DEVICE WITH CERAMIC GARNET

CROSS-REFERENCE TO RELATED APPLICATIONS

The present application is a § 371 application of International Application No. PCT/EP2015/075728 filed on Nov. 4, 2015 and entitled "LIGHTING DEVICE WITH CERAMIC GARNET", which claims the benefit of European Patent Application No. 14192693.1 filed on Nov. 11, 2014. International Application No. PCT/EP2015/075728 and European Patent Application No. 14192693.1 are incorporated herein.

FIELD OF THE INVENTION

The invention relates to a lighting device, such as for use in a projector. The invention further relates to a ceramic garnet for used in such lighting device, as well as a method for the production of such ceramic garnet.

BACKGROUND OF THE INVENTION

Luminescent rods are known in the art. WO2006/054203, for instance, describes a light emitting device comprising at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, characterized in that the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_1 \ldots A_n$ and each of the at least one exit surface(s) having an exit surface area, the exit surface area(s) being numbered $E_1 \ldots E_n$ and the sum of each of the at least one entrance surface(s) area(s) A being $A=A_1+A_2 \ldots +A_n$ and the sum of each of the at least one exit surface(s) area(s) E being $E=E_1+E_2 \ldots +E_n$.

US2007/279914 describes an illumination system including a source of incoherent light capable of generating light in a first wavelength range and an elongate body that emits light in a second wavelength range when illuminated by light in the first wavelength range. The body has a length dimension, a width dimension and a height dimension. At least a portion of the body is tapered so as to increase in width and/or height along the length dimension. The body further includes an extraction surface. A first non-extraction surface extends along at least a portion of the length of the body and is disposed so as to share a common edge with the extraction surface. At least some of the light at the second wavelength is totally internally reflected at the non-extraction surface. At least one external reflector is disposed proximate to the non-extraction surface so as to create a gap between the external reflector and the non-extraction surface.

US2011/210658 describes a ceramic composite laminate including a wavelength-converting layer and a non-emissive layer, wherein the ceramic composite laminate has a wavelength conversion efficiency (WCE) of at least 0.650. The ceramic composite laminate can also include a wavelength-converting ceramic layer comprising an emissive material and a scattering material, wherein the laminated composite has a total transmittance of between about 40% to about 85%. The wavelength-converting layer may be formed from plasma YAG:Ce powder.

SUMMARY OF THE INVENTION

Luminescent ceramic garnets doped with $Ce^{3+}$ (trivalent cerium) can be used to convert blue light into light with a longer wavelength, e.g. within the green to red wavelength region, such as in the range of about 500-750 nm, sometimes even in the blue region. To obtain sufficient absorption and light output in desired directions, it is advantageous to use transparent rods. Such rod can be used as light concentrator, concentrating over their length light source light from light sources such as LEDs (light emitting diodes), converting this light source light into converter light and providing at an exit surface a substantial amount of converter light. Lighting devices based on light concentrators may e.g. be of interest for projector applications.

It appears that as garnets have cubic crystal symmetry, both single crystals and ceramic rods (i.e. sintered polycrystalline material) can be used. However, it was surprisingly found that ceramic garnet compositions are prone to saturation, i.e. the efficiency of light generation inside the rod is reduced when the light intensity (of the pump light) increases. Further, it was surprisingly found that single crystals under (almost) the same conditions do not show this effect, or to a far lesser extent than ceramics. Hence, lighting devices using high excitation fluxes may have a substantial lower efficiency when using ceramics than when using single crystals. Further, such lighting devices may (thus) have a substantial non-linear dependence of the power and/or of the length of the ceramic body, which is not desired. However, as ceramics (i.e. sintered ceramic bodies) are more easily made, there is a desire to use ceramics.

Hence, it is an aspect of the invention to provide an alternative lighting device, which preferably further at least partly obviates one or more of above-described drawbacks. It is also an aspect of the invention to provide an alternative projector or projector device, which preferably further at least partly obviates one or more of above-described drawbacks. Yet, it is an aspect of the invention to provide a method for providing a light concentrator for such lighting device (and projector), which preferably further at least partly obviates one or more of above-described drawbacks.

In a first aspect, the invention provides a lighting device ("device") comprising a plurality of solid state light sources (such as at least 10, like at least 50) and an elongated ceramic body (herein also indicated as "light concentrator") having a first face and a second face, these first face and second face especially defining a length (L) of the elongated ceramic body (herein also indicated as "ceramic body"), the elongated ceramic body comprising one or more radiation input faces and a radiation exit window, wherein the second face comprises said radiation exit window, wherein the plurality of solid state light sources are configured to provide (blue) light source light to the one or more radiation input faces and (wherein the solid state light sources) are especially configured to provide to at least one of the radiation input faces a photon flux of (in average) in the range of especially at least $1.0*10^{17}$ photons/(s·mm²), such as even more especially at least $4.5*10^{17}$ photons/(s·mm²). Assuming blue (excitation) light, this may e.g. correspond to a blue power ($W_{opt}$) provided to at least one of the radiation input faces of in average at least 0.067 Watt/mm² and 0.2 Watt/mm², respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source light is applied) is also an average over time. Especially, the elongated ceramic body comprises a ceramic material configured to wavelength convert at least part of the (blue) light source light into converter light, such as light in the range of green to red, which converter light at least partly escapes from the radiation exit window, wherein the ceramic material especially comprises an $A_3B_5O_{12}:Ce^{3+}$ ceramic material ("ceramic garnet"), wherein A comprises one or more of yttrium (Y), gadolinium (Gd) and lutetium (Lu), and wherein B comprises aluminum (Al) and/or gallium (Ga). As further indicated below, A may also refer to other rare earth elements and B may include Al only, but may optionally also include gallium. The formula $A_3B_5O_{12}:Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

In yet a further aspect, the invention also provides such elongated ceramic body per se, i.e. an elongated ceramic body having a first face and a second face, these faces especially defining the length (L) of the elongated ceramic body, the elongated ceramic body comprising one or more radiation input faces and a radiation exit window, wherein the second face comprises said radiation exit window, wherein the elongated ceramic body comprises a ceramic material configured to wavelength convert at least part of (blue) light source light into converter light, such as (at least) one or more of green and red converter light (which at least partly escapes from the radiation exit window when the elongated ceramic body is irradiated with blue light source light), wherein the ceramic material comprises an $A_3B_5O_{12}:Ce^{3+}$ ceramic material, wherein A may comprise one or more of yttrium (Y), gadolinium (Gd) and lutetium (Lu), and wherein B may comprise aluminum (Al).

It appears that such lighting device and such ceramic body can be used under high power irradiation, such as at least $2.0*10^{17}$ photons/(s·mm²), like at least $2.5*10^{17}$ photons/(s·mm²), like especially at least $4.5*10^{17}$ photons/(s·mm²), without substantial saturation losses. Especially of interest are those ceramic garnets that—after having been provided as ceramic body, such as a rod—have been subjected to an annealing step in the presence of (some) oxygen. This contra-intuitive annealing (as trivalent cerium tends to oxidize to tetravalent cerium, which is detrimental to the luminescence), appears to have a beneficial effect on the removal and/or redistribution of oxygen vacancies in the ceramic body. Hence, especially the concentrator is subject to an annealing step in an atmosphere comprising oxygen.

The ceramic material comprises a garnet material. Hence, the elongated body especially comprises a luminescent ceramic. The garnet material, especially the ceramic garnet material, is herein also indicated as "luminescent material". The luminescent material comprises a $A_3B_5O_{12}:Ce^{3+}$ (garnet material), wherein A is especially selected from the group consisting of Sc, Y, Tb, Gd, and Lu, wherein B is especially selected from the group consisting of Al and Ga. More especially, A comprises one or more of yttrium (Y), gadolinium (Gd) and lutetium (Lu), and B comprises aluminum (Al). Such garnet may be doped with cerium (Ce), and optionally with other luminescent species such as praseodymium (Pr). In a specific embodiment, B consists of about 40% or more of Al and 60% or less of Ga. Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. In another variant, B and O may at least partly be replaced by Si and N. As indicated above, the element A may especially be selected from the group consisting of yttrium (Y), gadolinium (Gd), terbium (Tb) and lutetium (Lu).

In a specific embodiment, in a first option A in the ceramic material comprises for at least 90% Lu, or wherein in a second option A in the ceramic material comprises in the range of 50-95% Y and in the range of 5-50% Gd, and wherein in both options B in the ceramic material comprises for at least 95% Al and Ga, such as at least 40% Al, even more especially at least 80% Al, like at least 90% Al. The first option may provide a ceramic body that may especially be used for generation of green light (green converter light), and the second option may provide a ceramic body that may especially be used for generation of red light (red converter light). Both embodiments provide relative broad band emissions, in general covering more than a single color. For instance, the emission of the first ceramic material may also include intensity in the yellow and red part of the spectrum and the emission of the second ceramic material may also include intensity in the green, yellow and red part of the spectrum. Undesired light may be filtered out with an optical filter (see below) (and/or when the undesired light is of short wavelength, can be reflected back into the ceramic rod by use of e.g. an interference filter). In yet a further embodiment, $A_3B_5O_{12}:Ce^{3+}$ comprises $Y_3Al_5O_{12}:Ce^{3+}$.

A further interesting feature of the present elongated ceramic body is the fact that over certain length, the body can be sized down or sized up, with the light output (flux) scaling with the length. With prior art ceramic bodies, especially those without the herein described annealing, this may not be possible. Hence, in a further embodiment the lighting device has a lumen output of the converter light downstream from the radiation exit window, wherein at a fixed photon flux (per mm²) (at the radiation input face(s)) the lumen output is at scalable with the length (L) of the ceramic body at least within the length (L) range of 20-100 mm. This may be of especial relevance at the indicated (high) photon fluxes, such as at least $1*10^{17}$ photons/(s·mm²), for instance at least $2.0*10^{17}$ photons/(s·mm²), like especially at least $4.5*10^{17}$ photons/(s·mm²).

As indicated herein, the spectral properties of the ceramic body after annealing may also differ from the unannealed ceramic body. It appears for instance that a thermo luminescence spectrum of the ceramic material shows a maximum in the range of 50-100° C. which maximum intensity is in the range of equal to or higher than the maximum intensity in the same range of the same material but provided as single crystal, such as about 1.5 times higher, like 2-10 times higher than the maximum intensity in the same range of the same material but provided as single crystal. Hence, the thermo luminescence is relatively similar to that of the single crystal. However, the thermo luminescence spectrum of the unannealed ceramic body has such maximum intensity that is one or more orders of magnitude higher than of the single crystal (and of the annealed ceramic body), such as at least 15 times higher than of the corresponding single crystal (i.e. a crystal having the same composition as the ceramic). Hence, there is a substantial reduction in the concentration of the oxygen vacancies. Further, it also appears that the ratio of the intensity of the lowest excitation band relative to the intensity of the one but lowest excitation band increases due to the oxidative annealing. For instance, before annealing the ratio may be in the order of 1.2 and after annealing the ratio may be in the order of 1.4. Hence, in an embodiment this ratio is in the range of 1.25-1.6. Further, in an embodiment the ratio is at least 15% higher, especially at least 20% higher for the oxidative annealed ceramic body than for the same ceramic body but not (yet) oxidatively annealed).

As indicated below, especially the ceramic material is obtainable by a sintering process and/or a hot pressing process, followed by an annealing in an (slightly) oxidizing atmosphere. Therefore, in a specific embodiment the elongated ceramic body is obtainable by a method comprising a vacuum sintering process and an isostatic pressing process (see also below) at elevated temperatures of starting material (which may have been pre-sintered at elevated temperatures), to provide the elongated ceramic body, followed by a method comprising an annealing process in an oxidizing atmosphere at a temperature of at least 1000° C. Yet even more especially, the elongated ceramic body is obtainable by a method comprising a vacuum sintering process and an isostatic pressing process at elevated temperatures of starting material in a neutral or reducing atmosphere, to provide the elongated ceramic body, followed by said method comprising said annealing process (in an oxidizing atmosphere at a temperature of at least 1000° C.). Hence, especially the herein described method for the production of an elongated ceramic body includes a method comprising processing starting material at elevated temperatures, which is especially performed in a neutral or reducing atmosphere. The starting material may include a mixture of starting powders (which may especially have been pre-sintered at elevated temperatures). However, the starting material may also include a powder compact or green body (shaped starting powder, for instance obtainable by dry pressing). The oxidizing atmosphere may include one or more of $N_2$, $CO_2$, Ar, He, Kr, etc., as well as (some) $O_2$.

Ceramic bodies that have been treated in this way are substantially better (more efficient in light concentration (at high light source powers)) than untreated ceramic bodies. The optical properties and/or efficiency come close to those of single crystals (see also above). However, as indicated above ceramic bodies may be produced quicker and more easily and for this reason at significantly lower costs than single crystals.

The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the ceramic body can be close to the density of a single crystal. However, a difference is that grain boundaries are available in the ceramic body, as the ceramic body is polycrystalline. Such grain boundaries can e.g. be detected by optical microscopy or SEM. Hence, herein the ceramic body especially refers to a sintered polycrystalline having a density substantially identical to a single crystal (of the same material). Such body may thus be highly transparent for visible light (except for the absorption by the light absorbing species such as especially $Ce^{3+}$).

Hence, in a further aspect the invention also provides a method for the production of an elongated ceramic body, especially having a length (L) and further especially having a width (W) and height (H) with L>W and L>H, the elongated ceramic body comprising one or more radiation input faces and a radiation exit window, wherein the elongated ceramic body comprises a ceramic material configured to wavelength convert at least part of the (blue) light source light into at least one or more of green and red converter light, wherein the ceramic material comprises an $A_3B_5O_{12}$:$Ce^{3+}$ ceramic material, wherein A especially comprises one or more of yttrium, gadolinium and lutetium, and wherein B especially comprises aluminum, the method comprising processing starting material at elevated temperatures to provide the elongated ceramic body, and annealing in an annealing process the elongated ceramic body in an oxidizing atmosphere at a temperature of at least 1000° C., such as especially at least 1200° C. The starting material may comprise e.g. oxides or oxalates or other precursor materials of the lanthanides including yttrium and of the aluminum etc. The starting material, such as a powder compact, are in general heated to a temperature of at least 1500° C., in general in a reducing or inert atmosphere, i.e. in the absence or substantial absence of oxygen ($O_2$) or other oxidizing species, and especially under vacuum, such as lower than $1.10^{-4}$ bar. Hence, in an embodiment the method comprising processing starting material at elevated temperatures is performed in a neutral or reducing atmosphere. Hence, the method may include a pre-sintering, followed by a heating at elevated pressures. The herein described ceramic body is especially obtainable (or more especially obtained) by the herein described method for the production of said ceramic body.

To provide the luminescent ceramics having different emission characteristics, the starting materials and/or the composition of starting materials may be different. Hence, in a further embodiment the starting material is chosen to provide in a first option A in the ceramic material comprising for at least 90% Lu, or to provide in a second option A in the ceramic material comprising in the range of 50-95% Y and in the range of 5-50% Gd, and wherein in both options B in the ceramic material comprises for at least 95% Al+Ga. For other luminescent ceramics, another composition of the starting material may be chosen.

The above described process especially provides a sintered garnet body, which is especially subjected to the high pressure process at elevated temperatures, such as HIP (see above). Hence, especially the method comprising processing starting material at elevated temperatures comprises a method comprising a vacuum sintering process and an isostatic pressing process, even more especially a presintering at elevated pressure followed by said high pressure process at elevated temperatures.

After obtaining the ceramic body, the body may be polished. Before or after polishing the annealing process (in an oxidative atmosphere) may be executed, especially before polishing. In a further specific embodiment, said annealing process lasts for at least 2 hours, such as at least 2 hours at at least 1200° C. Further, especially the oxidizing atmosphere comprises for example $O_2$. It was found that in some embodiments, especially at cerium concentrations larger than about 0.5%, already concentrations in the order of 5-100 ppm of $O_2$ may be enough, or even lower. Good results were even obtained with lower $O_2$ pressures, like at least 0.01 ppm ($10^{-8}$ bar $O_2$). This oxygen (partial) pressure may be obtained in several ways as known to the person skilled in the art. Hence, the oxidizing atmosphere may comprise air, but may in embodiments also comprise an inert gas, such as a gas comprising one or more of $N_2$, He, Ne, Ar, etc., with some oxygen, such as 0.01 ppm-100% oxygen, like e.g. in the range of 1-100,000 ppm, such as 10-1000 ppm $O_2$.

The ceramic body has light guiding or wave guiding properties. Hence, the ceramic body is herein also indicated as wave guide or light guide. As the ceramic body is used as light concentrator, the ceramic body is herein also indicated as light concentrator. The ceramic body will in general have (some) transmission of visible light in a direction perpendicular to the length of the ceramic body. Without the activator such as trivalent cerium, the transmission in the visible might be close to 100%.

Herein, the term "visible light" especially relates to light having a wavelength selected from the range of 380-780 nm. The transmission can be determined by providing light at a specific wavelength with a first intensity to the ceramic body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The ceramic body may have any shape, such as beam like or rod like. However, the ceramic body may also be disk like, etc. The invention is not limited to specific embodiments of shapes, neither is the invention limited to embodiments with a single exit window or outcoupling face. Below, some specific embodiments are described in more detail. Would the ceramic body have a circular cross-section, then the width and height may be equal (and may be defined as diameter).

In a specific embodiment, the ceramic body may especially have an aspect ratio larger than 1, i.e. the length is larger than the width. In general, the ceramic body is a rod or bar (beam), though the ceramic body does not necessarily have a square, rectangular or round cross-section. In general, the light source is configured to irradiate one of the longer faces (side edge), herein indicated as radiation input face, and radiation escapes from a face at a front (front edge), herein indicated as radiation exit window. Especially, in embodiments the solid state light source, or other light source, is not in physical contact with the ceramic body. Physical contact may lead to undesired outcoupling and thus a reduction in concentrator efficiency. Further, in general the ceramic body comprises two substantially parallel faces, the radiation input face and opposite thereof the opposite face. These two faces define herein the width of the ceramic body. In general, the length of these faces defines the length of the ceramic body. However, as indicated above, and also below, the ceramic body may have any shape, and may also include combinations of shapes. Especially, the radiation input face has an radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated ceramic body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive or digital projectors, a small but high intense emissive surface is desired. This cannot be obtained with a single LED, but can be obtained with the present lighting device. Especially, the radiation exit window has a radiation exit window area (E) selected from the range of 1-100 mm$^2$. With such dimensions, the emissive surface can be small, whereas nevertheless high intensity may be achieved. As indicated above, the ceramic body in general has an aspect ratio (of length/width). This allows a small radiation exit surface, but a large radiation input surface, e.g. irradiated with a plurality of solid state light sources. In a specific embodiment, the ceramic body has a width (W) selected from the range of 0.5-100 mm. The ceramic body is thus especially an integral body, having the herein indicated faces.

The generally rod shaped or bar shaped ceramic body can have any cross sectional shape, but in embodiments has a cross section the shape of a square, rectangle, round, oval, triangle, pentagon, or hexagon. Generally the ceramic bodies are a cuboid, but may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a ceramic body having a round cross section. Hence, in embodiments the elongated ceramic body further has a width (W) and a height (H), with especially L>W and L>H. Especially, the first face and the second face define the length, i.e. the distance between these faces is the length of the elongated ceramic body. These faces may especially be arranged parallel.

In embodiments, the elongated ceramic body comprises a first face and a second face at a distance of each other substantially equal to the length of the elongated body, with one or more faces (or edges) bridging the distance between the first face and the second face (and defining the perimeter of the body (together with the first face and the second face)). These one or more faces (or edges) may especially have the length of the elongated body. In case of a cuboid, the elongated body may thus include four of such faces, with the first face and second face as end faces, which essentially define the length of the body.

The ceramic body may also be a cylindrically shaped rod. In embodiments the cylindrically shaped rod has one flattened surface along the longitudinal direction of the rod and at which the light sources may be positioned for efficient incoupling of light emitted by the light sources into the ceramic body. The flattened surface may also be used for placing heat sinks. The cylindrical ceramic body may also have two flattened surfaces, for example located opposite to each other or positioned perpendicular to each other. In embodiments the flattened surface extends along a part of the longitudinal direction of the cylindrical rod.

The ceramic body as set forth below in embodiments according to the invention may also be folded, bended and/or shaped in the length direction such that the ceramic body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact ceramic body of which the total length, along which generally the light is guided, is relatively large, leading to a relatively high lumen output, but can at the same time be arranged into a relatively small space. For example luminescent parts of the ceramic body may be rigid while transparent parts of the ceramic body are flexible to provide for the shaping of the ceramic body along its length direction. The light sources may be placed anywhere along the length of the folded, bended and/or shaped ceramic body.

Parts of the ceramic body that are not used as light in coupling area or light exit window may be provided with a reflector. Hence, in an embodiment the lighting device further comprises a reflector configured to reflect luminescent material light back into the ceramic body. Therefore, the lighting device may further include one or more reflectors, especially configured to reflect radiation back into the ceramic body that escapes from one or more other faces than the radiation exit window. Especially, a face opposite of the radiation exit window may include such reflector, though in an embodiment not in physical contact therewith. Hence, the reflectors may especially not be in physical contact with the ceramic body. Therefore, in an embodiment the lighting device further comprises an optical reflector (at least) configured upstream of the radiation exit window and configured to reflect light back into the elongated ceramic body. Alternatively or additionally, optical reflectors may also be arranged at other faces and/or parts of faces that are not used to couple light source light in or luminescence light out. Especially, such optical reflectors may not be in physical contact with the ceramic body. Further, such optical reflector (s) may be configured to reflect one or more of the luminescence and light source light back into the ceramic body. Hence, substantially all light source light may be reserved for conversion by the luminescent material (i.e. the activator element(s) such as especially $Ce^{3+}$) and a substantial part of the luminescence may be reserved for outcoupling from the radiation exit window. The term "reflector" may also refer to a plurality of reflectors. The reflector may e.g. be configured at a distance of 0.1-10 mm from the first face and/or one or more other faces.

The terms "coupling in" and similar terms and "coupling out" and similar terms indicate that light changes from medium (external from the ceramic body into the ceramic body, and vice versa, respectively). In general, the light exit window will be a face (or a part of a face), configured (substantially) perpendicular to one or more other faces of the waveguide. In general, the ceramic body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

Downstream of the radiation exit window, optionally an optical filter may be arranged. Such optical filter may be used to remove undesired radiation. For instance, when the lighting device should provide green light, all light other than green may be removed, and when lighting device should provide red light, all light other than red may be removed. Likewise this may apply to a lighting device configured to provide yellow or orange light, etc. When a lighting device would be desired to provide green and red light, all light other than green and red may be filtered out. Hence, in a further embodiment the lighting device further comprises an optical filter configured downstream of the radiation exit window and configured to reduce the relative contribution of one or more of non-green and non-red light in the converter light. For filtering out light source light, optionally an interference filter may be applied. Likewise this may apply to another color, when a color other than green and red is desired. The optical filter may e.g. be configured at a distance of 0.1-10 mm from the second face, or optionally at zero distance (i.e. in physical contact). Especially, the optical filter may e.g. be configured at a distance of 0.1-10 mm from the radiation exit window, or optionally at zero distance.

In yet a further embodiment, the lighting device further comprises a collimator configured downstream of the radiation exit window and configured to collimate the converter light. Such collimator, like e.g. a CPC (compound parabolic concentrator), may be used to collimate the light escaping from the radiation exit window and to provide a collimated beam of light.

Further, the lighting device may include a heat sink configured to facilitate cooling of the solid state light source and/or luminescent concentrator. The heat sink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. The lighting device may further include one or more cooling elements configured to cool the ceramic body.

Especially, the light sources are light sources that during operation emit (light source light) at least light at a wavelength selected from the range of 200-490 nm, especially light sources that during operation emit at least light at wavelength selected from the range of 400-490 nm, even more especially in the range of 440-490 nm. This light may partially be used by the luminescent material. Hence, in a specific embodiment, the light source is configured to generate blue light. In a specific embodiment, the light source comprises a solid state LED light source (such as a LED or laser diode). The term "light source" may also relate to a plurality of light sources, such as e.g. 2-20 (solid state) LED light sources, though many more light sources may be applied. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the ceramic body.

The lighting device comprises a plurality of light sources. Especially, the light source light of the plurality (m) of light sources have spectral overlap, even more especially, they are of the same type and provide substantial identical light (having thus substantial the same spectral distribution). Hence, the light sources may substantially have the same emission maximum, such as within a bandwidth of 10 nm.

The light sources are especially configured to provide a blue optical power ($W_{opt}$) of at least 0.2 Watt/mm$^2$ to the ceramic body, i.e. to the radiation input face(s). The blue optical power is defined as the energy that is within the energy range that is defined as blue part of the spectrum (see also below). Especially, the photon flux is in average at least $4.5*10^{17}$ photons/(s·mm$^2$), such as at least $6.0*10^{17}$ photons/(s·mm$^2$). Further, in a specific embodiment the length (L) is at least 20 mm. In yet a further specific embodiment, the cerium concentration is in the range of 0.1-3.0% of A, such as e.g. 98% lutetium and 2% cerium.

In yet a further embodiment, especially for projector applications, the plurality of light sources are operated in pulsed operation with a duty cycle selected from the range of 10-80%, such as 25-70%.

In yet a further aspect, the invention provides a lighting unit configured to provide visible light, wherein the lighting unit comprises at least one lighting device as defined herein. For instance, such lighting unit may also comprise one or more (additional) optical elements, like one or more of optical filters, collimators, reflectors, wavelength converters, etc. The lighting unit may be, for example, a lighting unit for use in an automatic application, like a headlight. Hence, the invention also provides an automotive lighting unit configured to provide visible light, wherein the automotive lighting unit comprises at least one lighting device as defined herein and/or a digital projector unit comprising at least one lighting device as defined herein. Especially, the lighting device may be configured (in such applications) to provide green light or red light (and/or light of another color). In a specific embodiment, such lighting unit comprises at least a first lighting device configured to provide green light and at least a second lighting device configured to provide red light (and optionally a further lighting device configured to provide light of another color).

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting, etc.

In yet a further aspect, the invention provides a projector comprising the lighting device according to any one of the preceding claims. Especially, the invention provides such projector comprising at least two lighting devices according to any one of claims 1-9, wherein a first lighting device is configured to provide green light and wherein a second lighting device is configured to provide red light.

The terms "upstream" and "downstream" relate to an arrangement of items or features relative to the propagation of the light from a light generating means (here the espe-cially the first light source), wherein relative to a first position within a beam of light from the light generating means, a second position in the beam of light closer to the light generating means is "upstream", and a third position within the beam of light further away from the light generating means is "downstream".

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relative high blue component in the light source light.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-570 nm. The terms "orange light" or "orange emission" especially relate to light having a wavelength in the range of about 570-600. The terms "red light" or "red emission" especially relate to light having a wavelength in the range of about 600-780 nm. The term "pink light" or "pink emission" refers to light having a blue and a red component. The terms "visible", "visible light" or "visible emission" refer to light having a wavelength in the range of about 380-780 nm.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the ceramic body. The light guide or waveguide may convert the light of the first spectral distribution to another spectral distribution and guides the light to an exit surface.

Figure 1A:
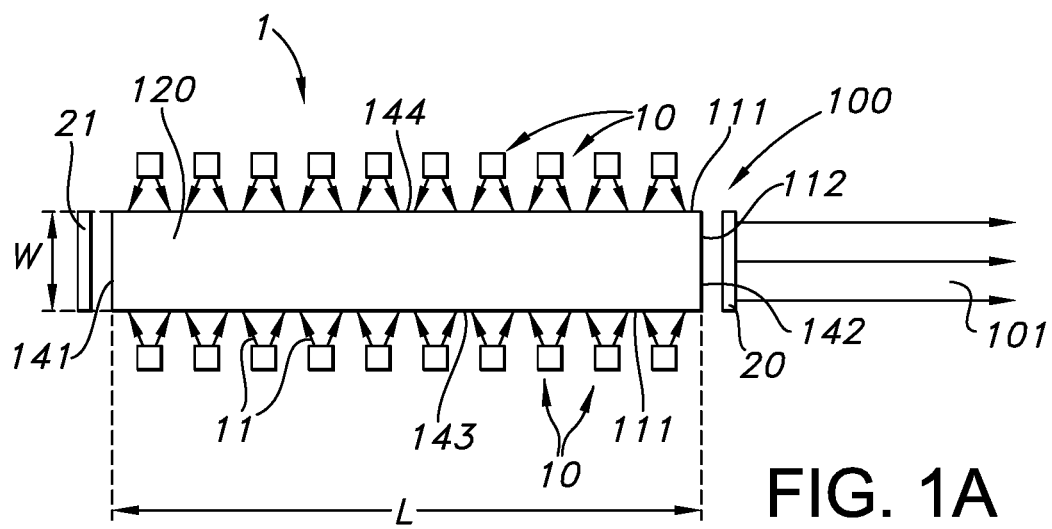
FIGS. 1a-1e schematically depict some aspects of the invention.

An embodiment of the lighting device as defined herein is schematically depicted in FIG. 1a. FIG. 1a schematically depicts a lighting device 1 comprising a plurality of solid state light sources 10 and an elongated ceramic body 100 having a first face 141 and a second face 142 defining a length L of the elongated ceramic body 100. The elongated ceramic body 100 comprising one or more radiation input faces 111, here by way of example two oppositely arranged faces, indicated with references 143 and 144 (which define e.g. the width W). Further the ceramic body 100 comprises a radiation exit window 112, wherein the second face 142 comprises said radiation exit window 112. The entire second face 142 may be used or configured as radiation exit window. The plurality of solid state light sources 10 are configured to provide (blue) light source light 11 to the one or more radiation input faces 111. As indicated above, they especially are configured to provide to at least one of the radiation input faces 111 a blue power $W_{opt}$ of in average at least 0.067 Watt/mm$^2$.

The elongated ceramic body 100 comprises a ceramic material 120 configured to wavelength convert at least part of the (blue) light source light 11 into converter light 101, such as at least one or more of green and red converter light 101. As indicated above the ceramic material 120 comprises an $A_3B_5O_{12}$:Ce$^{3+}$ ceramic material, wherein A comprises e.g. one or more of yttrium (Y), gadolinium (Gd) and lutetium (Lu), and wherein B comprises e.g. aluminum (Al). References 20 and 21 indicate an optical filter and a reflector, respectively. The former may reduce e.g. non-green light when green light is desired or may reduce non-red light when red light is desired. The latter may be used to reflect light back into the ceramic body or waveguide, thereby improving the efficiency. Note that more reflectors than the schematically depicted reflector may be used.

The light sources may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

Figure 1B:
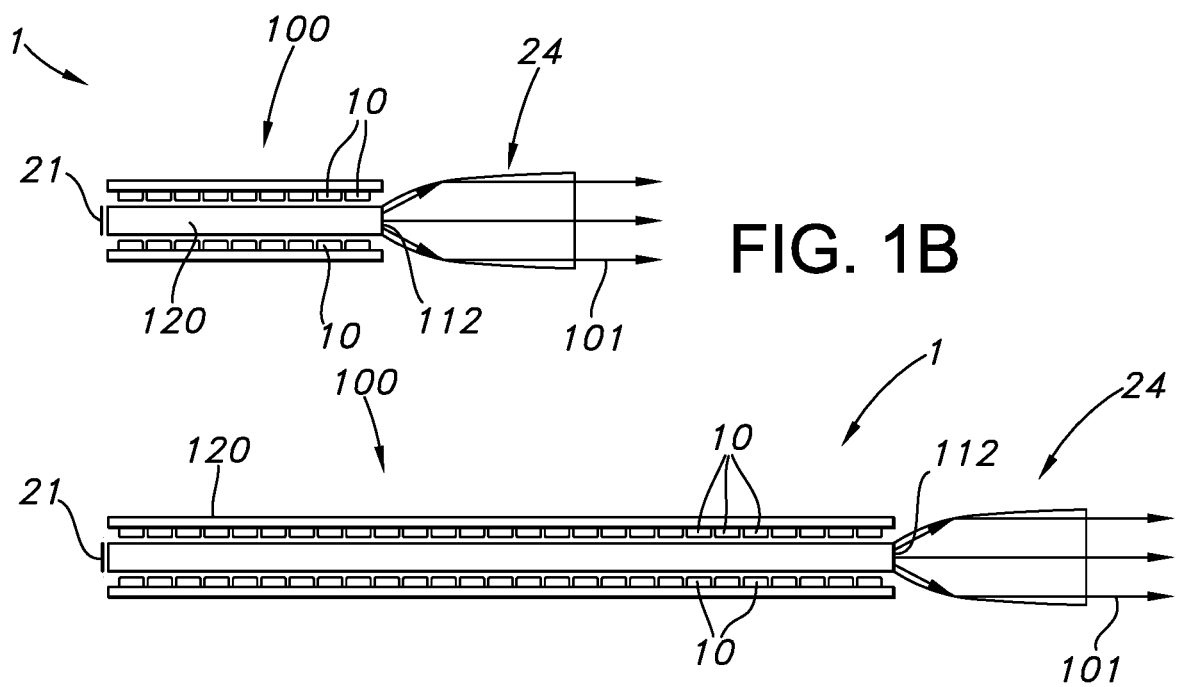

FIGS. 1a-1b schematically depict similar embodiments of the lighting device. Further, the lighting device may include further optical elements, either separate from the waveguide and/or integrated in the waveguide, like e.g. a light concentrating element, such as a compound parabolic light concentrating element (CPC). The lighting devices 1 in FIG. 1b further comprise a collimator 24, such as a CPC.

Figure 1C:
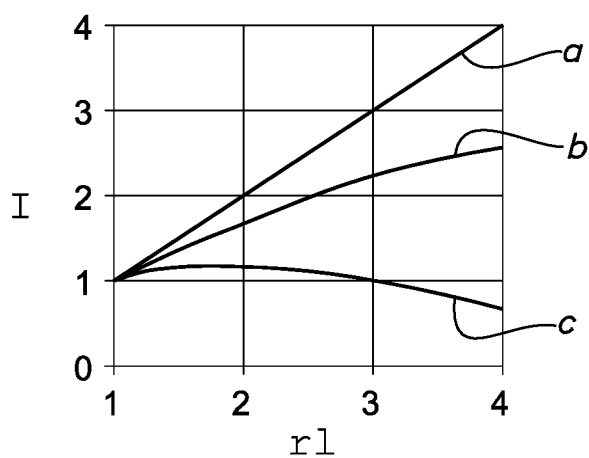

FIG. 1c schematically depicts the (non-)scalability of the ceramic waveguides. When the ceramic body with the light sources are scalable, the intensity of the lighting device light 101 scales with the length of the ceramic body (see FIGS. 1b-1c). The length is indicated with rl (relative rod length; x-axis) and the intensity is indicated with I (relative lumens, y-axis). A perfect scalability would be curve a (ideal scalability) in FIG. 1c. A single crystal comes in general very close to such scalable waveguide. Curve b (scalable, but non-ideal) shows a substantially scalable waveguide. The ceramic body as described herein (especially due to the post-annealing in an oxygen atmosphere), is close to ideally scalable. Over a substantial length variation, such as in the range of 20-100 mm, the ceramic bodies or waveguides as described herein appear to be scalable. Non-scalability is shown with curve c (non-scalable). For instance, ceramic bodies not having been subjected to the post-annealing are substantially less or even no scalable.

Figure 1D:
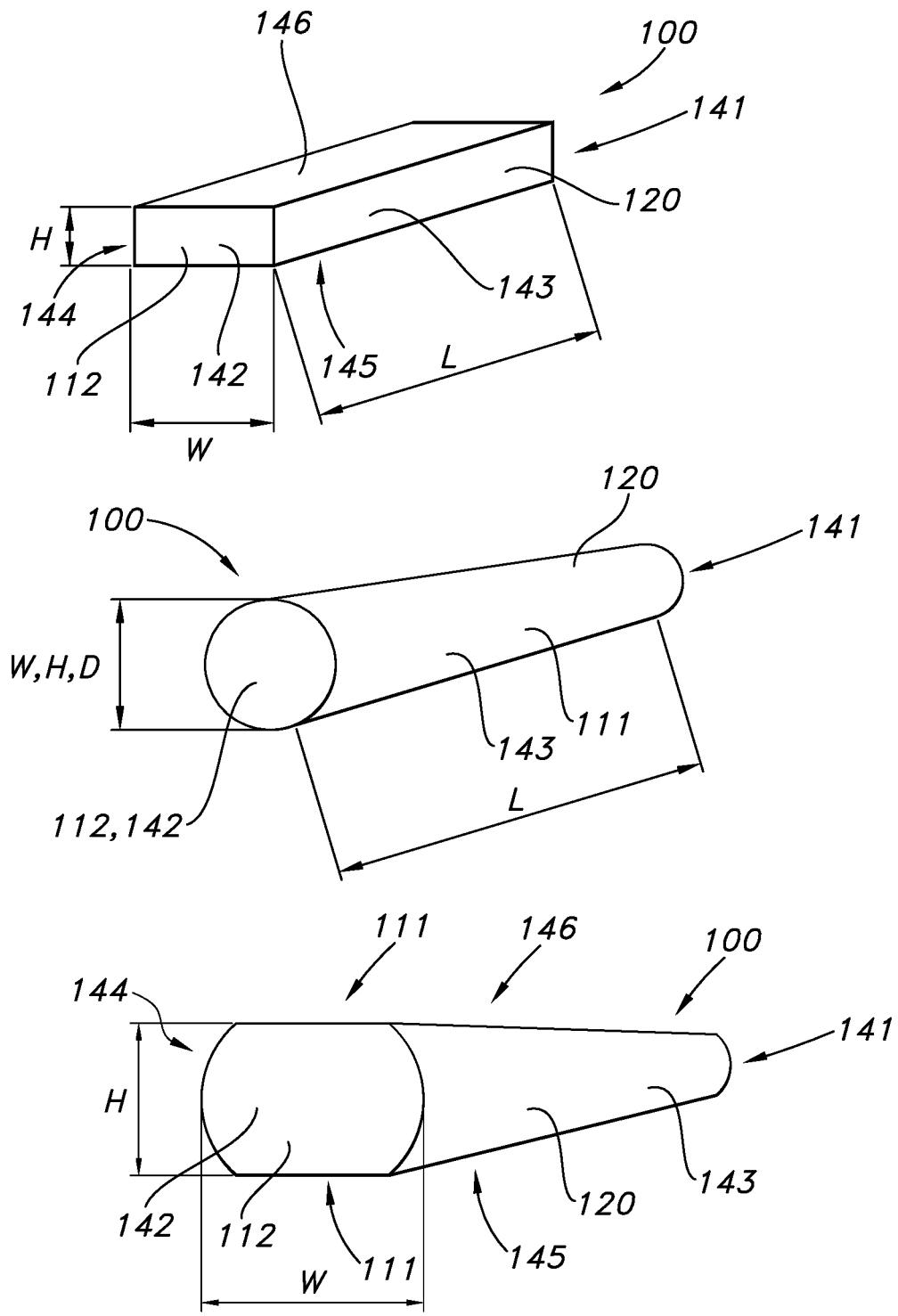

FIG. 1d schematically depicts some embodiments of possible ceramic bodies as waveguides or luminescent concentrators. The faces are indicated with references 141-146.

The first variant, a plate-like or beam-like ceramic body has the faces 141-146. Light sources, which are not shown, may be arranged at one or more of the faces 143-146. The second variant is a tubular rod, with first and second faces 141 and 142, and a circumferential face 143. Light sources, not shown, may be arranged at one or more positions around the ceramic body. Such ceramic body will have a (substantially) circular or round cross-section. The third variant is substantially a combination of the two former variants, with two curved and two flat side faces. The variants shown in FIG. 1d are not limitative. More shapes are possible; i.e. for instance referred to WO2006/054203, which is incorporated herein by reference. The ceramic bodies, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ration (of length/width) is especially larger than 1, such as equal to or larger than 2. Unless indicated otherwise, the term "aspect ratio" refers to the ratio length/width.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Figure 1E:
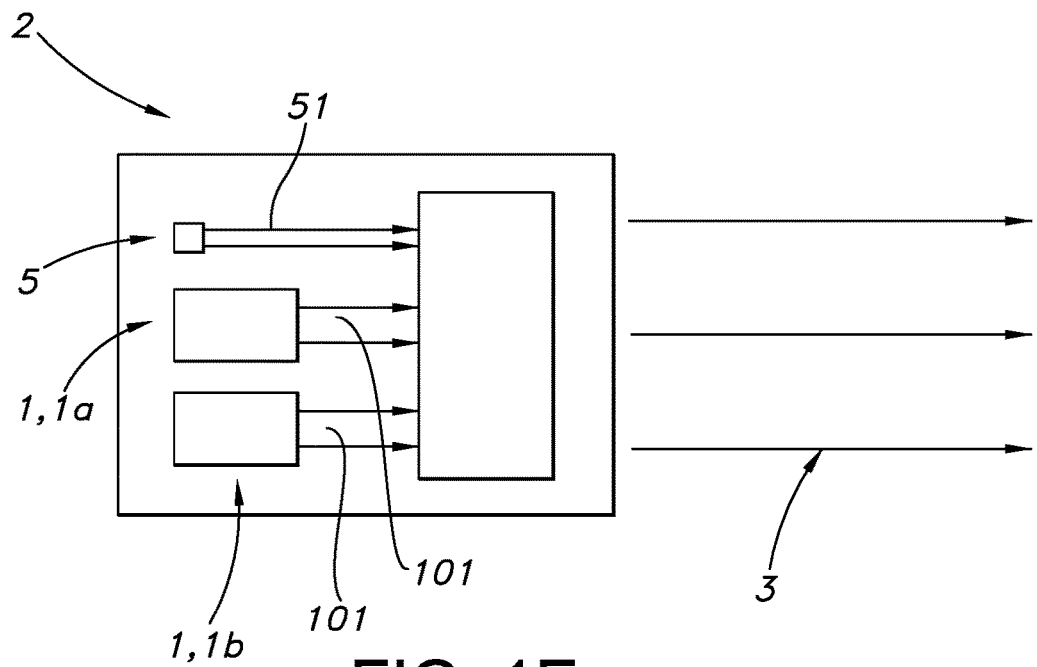

FIG. 1e very schematically depicts a projector or projector device 2 comprising the lighting device 1 as defined herein. By way of example, here the projector 2 comprises at least two lighting devices 1, wherein a first lighting device (1a) is configured to provide e.g. green light 101 and wherein a second lighting device (1b) is configured to provide e.g. red light 101. Light source 5 is configured to provide blue light. These light sources may be used to provide the projection 3.

Several lighting devices were built and/or evaluated. Below, the blue flux density for pumping of 48 mm long rods; rod size: 1.2 (cool side)×1.9 (pump side)×48 mm:

| I peak (Amp) | Blue flux/ LED (Wopt) | # of LEDs | Total electric power in (W) @ 45% DC | Total optical blue power (Wopt) @ 45% DC | Flux density on LED 2 mm$^2$ (Wopt/mm$^2$) @ 45% DC | Flux density on rod averaged over rod area (91.2 mm$^2$) @ 45% DC Wopt/mm$^2$ per side |
|---|---|---|---|---|---|---|
| 0.26 | 0.165 | 52 | 16 | 8.6 | 0.165 | 0.047 |
| 2.24 | 1.11 | 52 | 165 | 57.8 | 1.11 | 0.317 |
| 4 | 1.54 | 52 | 300 | 80 | 1.54 | 0.439 |

The value of 2.24 A (ampere; Amp) is the maximum current in test module used. The 4 A values are extrapolated. The coupling efficiency to the rod is assumed to be 100%, in reality 85-90% is more likely. Further, over the rod surface an incident uniform blue flux distribution is assumed. In reality some hot spots may occur, but always less severe than the flux density on the LEDs itself. The rod is pumped from 2 sides; the incident blue flux density on the rod is calculated per side, assuming that one side is excited by the LEDs positioned on the corresponding side. This will hold when the dopant concentration, typically Ce, is sufficiently high to absorb the blue light over a thin layer. The data in the table holds for a pulsed operation with at duty cycle (DC) of 45%. More power can be generated at the same peak current by increasing the DC, e.g. up to 60%, but not much higher as there is also time needed for the sequential switching of the other 2 color channels in a DLP projector. For a LCD projector direct current drive is used (100% DC).

In a further example, green and red luminescent ceramics were compared. Flux output density is taken as output from a CPC extraction optic with the rod placed inside a blue LED pump module. Rod length=48 mm; LED count: 52×2 mm$^2$ high power LEDs. The rod cross-section area is 1.2×1.9 mm=2.28 mm$^2$:

| | LuAG green Wopt, green | Green flux density (Wopt/mm$^2$) | YGdAG red Wopt, red | Red flux (Wopt/mm$^2$) |
|---|---|---|---|---|
| 2.2 A, 45% DC | 14 | 6.1 | 7.2 | 3.2 |
| 4 A, 45% DC estimate | 20 | 8.8 | 10 | 4.4 |

LuAG (Lu$_3$Al$_5$O$_{12}$:Ce$^{3+}$) garnet is used for green emission; YGdAG ((Y+Gd)$_3$Al$_5$O$_{12}$:Ce$^{3+}$) garnet for red. YGdAG is actually yellow emitting, also containing green and red. The green part is filtered out in order to use the red part in the beamer. Part of the light may bounce several times up and down inside the rod. There is still further improvement potential in green and especially in red. More optimized red may be only slightly lower performing than green. Instead of 52 LEDs, also 56 LEDs of 1 mm$^2$ could be used to pump a 52 mm rod, increasing flux with 8%. Improvements to the blue LED output (previous slide) directly improves the green/red output with the same factor. Doubling the rod length (and LED count) may ideally double the output, hence double the density. Therefore a 10 cm rod could have a green density of 18-20 Wopt/mm$^2$ on the nose exit.

Figure 2A:
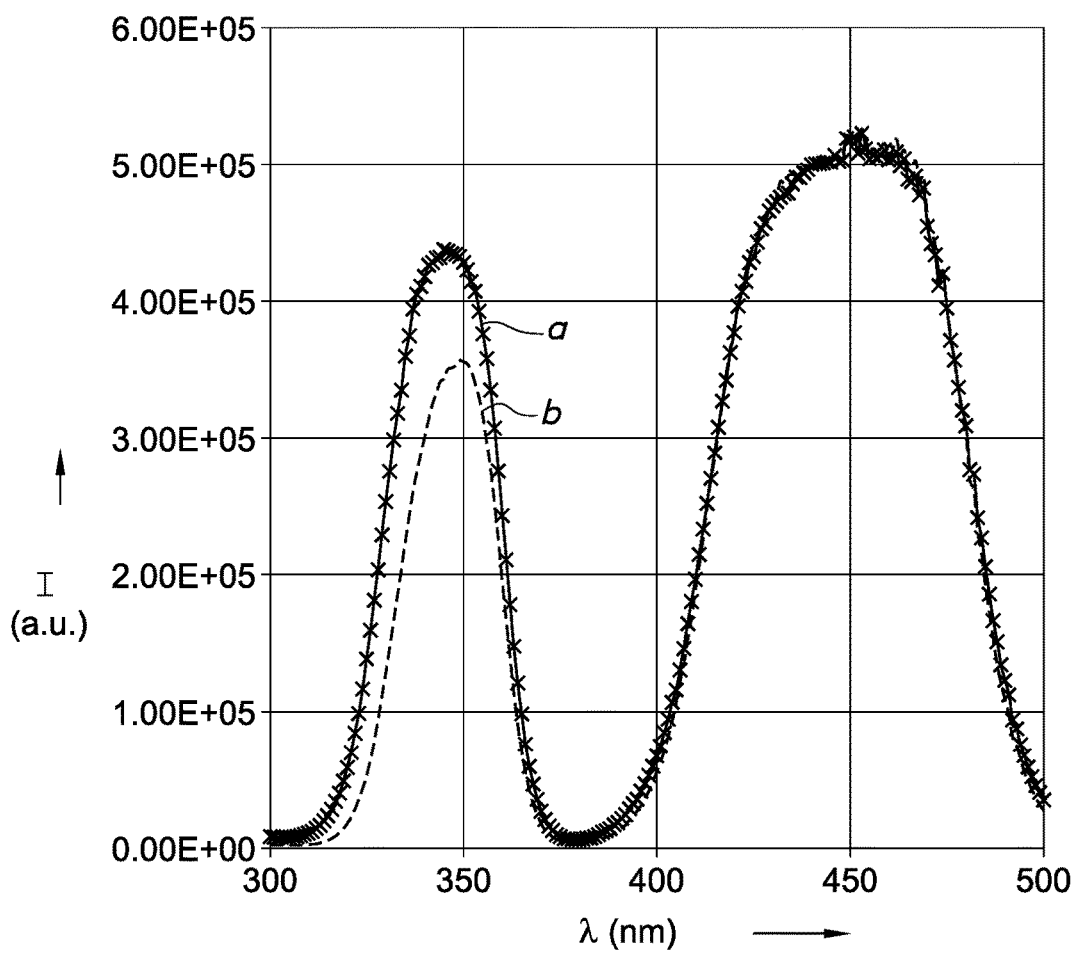
FIGS. 2a-2d show some results of some ceramic bodies and lighting devices made.

FIG. 2a shows the excitation spectrum of a ceramic garnet rod with a composition according to the invention, here LuAG. The excitation (at maximum emission) is shown for a ceramic body having been treated in a H$_2$/N$_2$ mixture with H$_2$O (a) and having been treated under oxidative conditions (b) as defined in the present application. The ratio of the intensity of the lowest excitation band relative to the intensity of the one but lowest excitation band increases (from 1.17 to 1.44) due to the oxidative annealing.

Figure 2B:
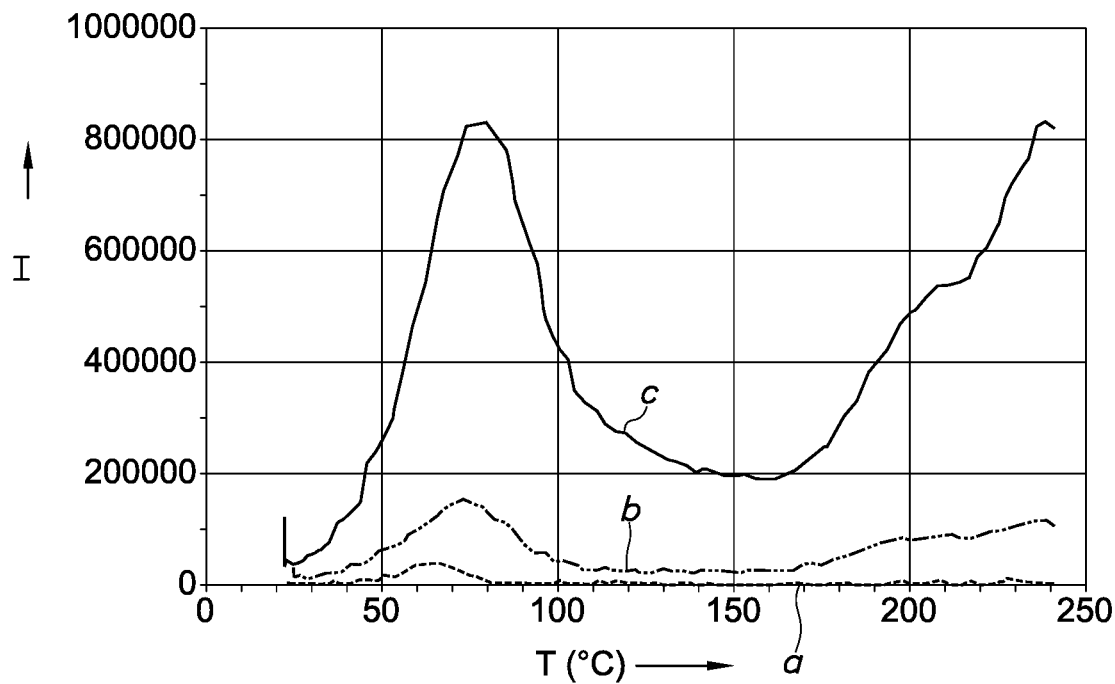
Figure 2C:
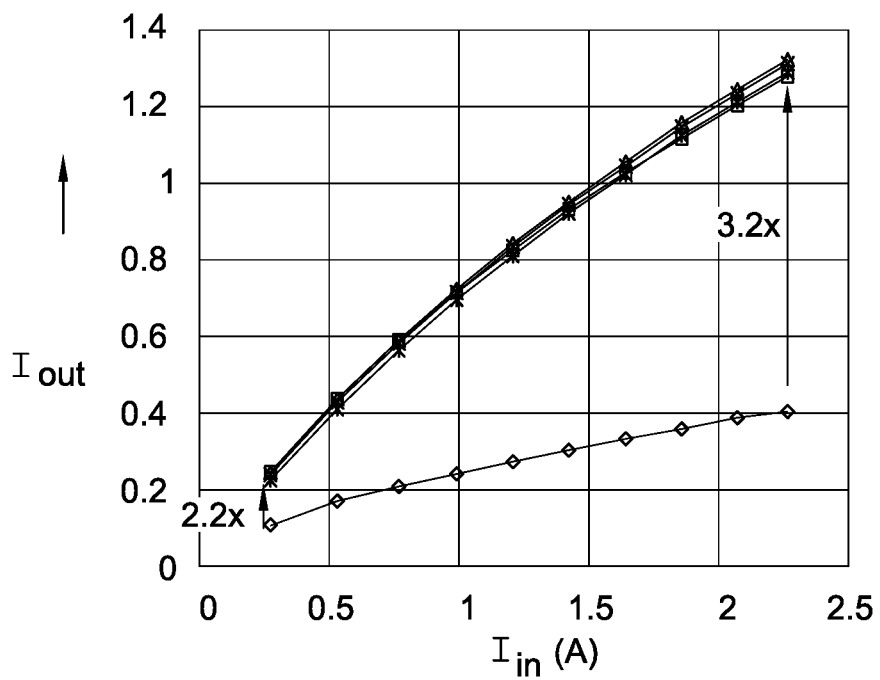
Figure 2D:
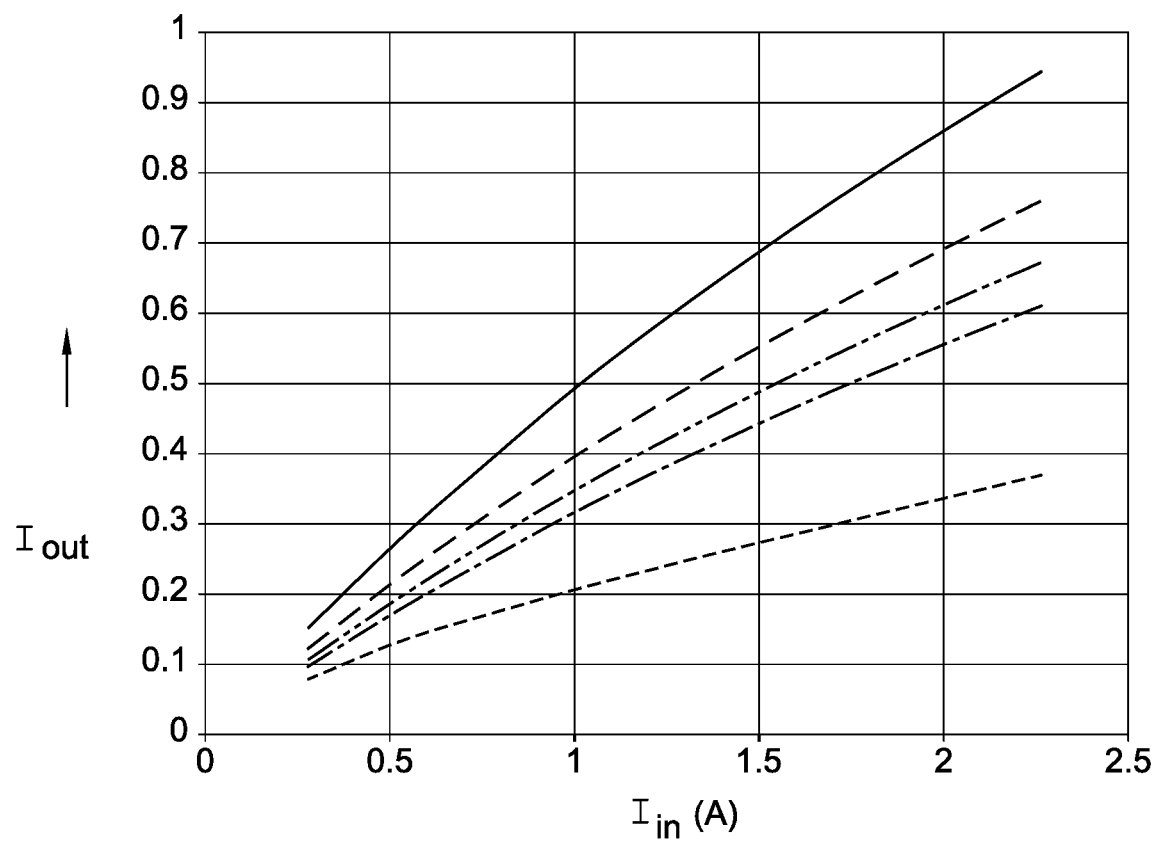

The impact of oxidative annealing is shown in FIGS. 2b and 2c-2d. FIG. 2b shows thermo luminescence data of different LuAG (pure Lu samples), with the lowest, a, being the thermo luminescence spectrum of a single crystal and with the highest, c, being the thermo luminescence spectrum of a non-annealed ceramic body. The middle curve, b, which is much closer to the single crystal curve, is the annealed ceramic body. The x-axis indicates the temperature in ° C., and the y-axis indicates the thermo luminescence intensity in arbitrary units. For the thermo luminescence data, the samples are shorty submitted to UV illumination (360 nm) and then heated in the dark with a linear heating rate. The emitted light intensity is measured as a function of the sample temperature.

The polycrystalline YGdAG rod shows after HIP and wet forming gas anneal (reducing atmosphere) a low performance. Afterglow of trap states is visible when the rod is put at elevated temperature (due to release of trapped charges, followed by radiative recombination). By an oxidative post-anneal step, such as the extra anneal in an O$_2$ containing atmosphere, for 4 hrs. at 1250° C., a strong increase in light output is observed, related to reduction of trap states. No afterglow is seen. The relative difference between the oxidized rod and the native rod is clearly increasing with increased LED power/flux density.

Ceramic bodies with 0.25% Ce and 25% Gd (FIG. 2c), and with 1% Ce and 25% Gd (FIG. 2d) were tested on the impact of oxidative annealing. Rods of 1.2 mm*1.9 mm*52 mm, with 52 LED modules, with 10% duty cycle were used as devices for the tests. In FIG. 2c, the order of the curves, from the lowest curve to the highest curve is: No anneal; 1% O2; 5% O2; 21% O2; CO anneal. When no anneal is performed, the results are substantially lower than all oxidative anneals (at 1250° C.). In FIG. 2d, the order of the curves, from the lowest curve to the highest curve is: 1st reference (no oxidative anneal); 1% O2 anneal; 0.5% O2 anneal; 0.1% O2 anneal; N2 Anneal (with a few ppm O2).

Now, an example of a synthesis of a ceramic body is described. The desired combination of raw materials, Lu2O3, Y2O3, Gd2O3, Al2O3 and CeO2 are weighed out in a jar. The raw materials are wet-mixed in water using alumina milling balls. Binder is added and the suspension is dried (e.g.: spray drying). The granulate is dry-pressed into the desired from using a steel die, with pressures in the range of about 1 ton/cm$^2$. The pressed samples are first fired in air at 1000° C. in order to remove all organic substances (binder). Then the samples are sintered in a vacuum oven typically at 1700° C., pressure <10$^{-5}$ bar. The vacuum sintered samples are subsequently Hot Isostatic Pressed (HIP), typically at 1700° C./1000 bar Ar or N$_2$ to achieve near zero porosity. After HIP the samples are to be annealed under varying oxidizing conditions typically at 1250° C. (see above experiments). Finally the samples are polished to obtain final product. For the here described stick samples the annealing was standard done in wet Forming gas (WFG) before polishing. Subsequent described annealing was done afterwards on the polished samples.

Hence, herein ceramic garnet compositions, doped with Ce$^{3+}$, in combination with suitable annealing steps, are described. The resulting ceramic sticks show light conversion efficiencies that are on par with single crystals of the same composition, also at high excitation densities using optimized processing conditions. Without annealing, the light conversion efficiencies at high excitation densities are significantly lower (30% or more). Thermally stimulated luminescence can be used to check whether the annealing step(s) that are essential part of the invention have been applied. Ceramic sticks that have not been annealed properly show a clear afterglow, especially at elevated temperatures.

The invention claimed is:

1. A lighting device comprising a plurality of solid state light sources and an elongated ceramic body having a first face and a second face and a length (L) of the elongated ceramic body, the elongated ceramic body comprising one or more radiation input faces and a radiation exit window, the second face comprising the radiation exit window, the plurality of solid state light sources configured to provide blue light source light to the one or more radiation input faces and configured to provide to at least one of the radiation input faces a photon flux of at least $1.0*10^{17}$ photons/(s·mm$^2$), the elongated ceramic body comprising a ceramic material configured to wavelength convert at least part of the blue light source light into converter light, the ceramic material comprising an A$_3$B$_5$O$_{12}$:Ce$^{3+}$ ceramic material, A comprising one or more of yttrium (Y), or gadolinium (Gd) or lutetium (Lu), B comprising aluminum (Al), the elongated ceramic body having a maximum thermo luminescence intensity between 50° C. and 100° C. at most 10 times higher than a maximum thermo luminescence intensity between 50° C. and 100° C. of a single crystal with the same A$_3$B$_5$O$_{12}$:Ce$^{3+}$ composition as the elongated ceramic body.

2. The lighting device of claim 1, wherein the elongated ceramic body is obtained by performing a vacuum sintering process and an isostatic pressing process at elevated temperatures of starting material in a neutral or reducing atmosphere, followed by the annealing process.

3. The lighting device of claim 1, further comprising an optical reflector configured upstream of the radiation exit window, wherein the optical reflector is configured to reflect light back into the elongated ceramic body, wherein the radiation exit window is configured perpendicular to the one or more radiation input faces, and wherein the lighting device further comprises an optical filter configured downstream of the radiation exit window and configured to reduce a relative contribution of one or more of non-green and non-red light in the converter light.

4. The lighting device of claim 1, wherein the length (L) is at least 20 mm, wherein a concentration of cerium is in a range of about 0.1% to about 3.0% of A, and wherein the photon flux is at least $4.5*10^{17}$ photons/(s·mm$^2$).

5. The lighting device of claim 4, having a lumen output of the converter light downstream from the radiation exit window, wherein at a fixed photon flux per mm$^2$ the device is configured so that the lumen output is scalable with the length (L) of the elongated ceramic body at least within a length (L) range of about 20 mm to about 00 mm.

6. The lighting device of claim 1, wherein, in a first option, A in the ceramic material comprises at least 90% Lu, or wherein, in a second option, A in the ceramic material comprises about 50% to about 95% Y and comprises about 5% to about 50% Gd, and wherein in both the first option and in the second option, B in the ceramic material comprises at least 95% Al and Ga.

7. The lighting device of claim 1, wherein the elongated ceramic body comprises a geometrical concentration factor, defined as a ratio of the radiation input faces area to the radiation exit window area, of at least 2.

8. A method for production of an elongated ceramic body, the elongated ceramic body comprising one or more radiation input faces and a radiation exit window, the elongated ceramic body configured to receive, at least one of the radiation input faces, a photon flux of at least $1.0*10^{17}$ photons/(s·mm²) and the elongated ceramic body comprising a ceramic material configured to wavelength convert at least part of a blue light source light into at least converter light, the ceramic material comprising an $A_3B_5O_{12}:Ce^{3+}$ ceramic material, A comprising one or more of yttrium, gadolinium and lutetium, B comprising aluminum, the method comprising processing starting material at elevated temperatures to provide the elongated ceramic body, and annealing the elongated ceramic body in an annealing process in an oxidizing atmosphere with less than 100,000 ppm $O_2$ at a temperature of at least 1000° C.

9. The method of claim 8, wherein the method comprises processing starting material at elevated temperatures, a vacuum sintering process, and an isostatic pressing process.

10. The method of claim 8, wherein processing the starting material at elevated temperatures is performed in a neutral or reducing atmosphere.

11. The method of claim 8, wherein the starting material is chosen such that, in a first option, A in the ceramic material comprises at least 90% Lu, or, in a second option, such that A in the ceramic material comprises in a range of about 50% Y to about 95% Y and in a range of about 5% Gd to about 50% Gd, and wherein in both the first option, and in the second option, B in the ceramic material comprises at least 95% Al and Ga.

* * * * *